United States Patent
Kim et al.

(10) Patent No.: US 9,315,697 B2
(45) Date of Patent: Apr. 19, 2016

(54) MULTI-BLOCK COPOLYMER

(71) Applicant: LG CHEM, LTD., Seoul (KR)

(72) Inventors: Su Jeong Kim, Daejeon (KR); Jeong Ae Yoon, Daejeon (KR); Min Ki Lee, Daejeon (KR); Han Na Chi, Daejeon (KR); No Ma Kim, Daejeon (KR); Sung Soo Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/478,430

(22) Filed: Sep. 5, 2014

(65) Prior Publication Data

US 2014/0375934 A1   Dec. 25, 2014

Related U.S. Application Data

(63) Continuation of application No. PCT/KR2014/003906, filed on May 1, 2014.

(30) Foreign Application Priority Data

May 2, 2013 (KR) .......................... 10-2013-0049553

(51) Int. Cl.

| C09K 19/00 | (2006.01) |
|---|---|
| C09J 153/00 | (2006.01) |
| C08F 299/04 | (2006.01) |
| G02B 5/30 | (2006.01) |
| G02F 1/1335 | (2006.01) |
| C08F 293/00 | (2006.01) |

(52) U.S. Cl.
CPC .......... *C09J 153/005* (2013.01); *C08F 293/005* (2013.01); *C08F 299/0464* (2013.01); *C09J 153/00* (2013.01); *G02B 5/30* (2013.01); *G02F 1/133528* (2013.01); *C08F 2438/01* (2013.01); *G02F 2202/28* (2013.01); *Y10T 428/10* (2015.01); *Y10T 428/1059* (2015.01)

(58) Field of Classification Search
CPC .. C09J 153/00; C09J 153/005; C09J 17/0221; C09J 155/005; C08F 293/005; C08F 299/0464; G08B 5/30; G02F 1/133528; G02F 2202/08; Y10T 428/10; Y10T 428/1036; Y10T 428/1059; Y10T 428/1077

USPC ................. 428/1.1, 1.3, 1.31, 1.5, 1.54, 1.55; 349/96; 525/245; 524/505, 515

See application file for complete search history.

(56) References Cited

U.S. PATENT DOCUMENTS

| 2003/0096111 A1* | 5/2003 | Husemann et al. ..... 428/355 AC |
| 2003/0119970 A1* | 6/2003 | Husemann .......... C08F 293/005 524/505 |
| 2010/0112270 A1* | 5/2010 | Bulliard et al. ................. 428/76 |
| 2010/0188620 A1* | 7/2010 | Kim et al. ....................... 349/96 |

FOREIGN PATENT DOCUMENTS

| CN | 101663370 A | 3/2010 |
| JP | 2006282687 A | 10/2006 |
| JP | 2007527463 A | 9/2007 |
| KR | 1020050076706 A | 7/2005 |
| KR | 1020110002857 A | 1/2011 |
| WO | 2005087819 A1 | 9/2005 |
| WO | 2009126532 A3 | 10/2009 |

OTHER PUBLICATIONS

Kwiatkowski, Piotr, High Molecular Weight Polymethacrylates by AGET ATRP under High Pressure, Macromolecules, 2008, 41, 1067-1069.

* cited by examiner

*Primary Examiner* — Ruiyun Zhang
(74) *Attorney, Agent, or Firm* — Dentons US LLP

(57) ABSTRACT

Provided are a multi-block copolymer, a pressure-sensitive adhesive composition, a method of preparing a multi-block copolymer, a pressure-sensitive adhesive polarizing plate, and a liquid crystal display device. The pressure-sensitive adhesive composition including the multi-block copolymer may have excellent durability regardless of a temperature and/or humidity. In addition, the method of preparing a multi-block copolymer may prepare a multi-block copolymer increased in molecular weight which is structurally controlled with a simple process using a compound containing at least two halogen atoms. Accordingly, when included in a pressure-sensitive adhesive resin, the multi-block copolymer may have excellent cohesive strength in the resin, and a network structure during curing, and thus, when applied to a pressure-sensitive adhesive composition, the multi-block copolymer may be usefully applied to an optical member due to excellent durability regardless of a temperature and humidity.

20 Claims, No Drawings

MULTI-BLOCK COPOLYMER

CROSS-REFERENCE TO RELATED APPLICATION

This application is a bypass continuation application of International Application No. PCT/KR2014/003906, filed on May 1, 2014, which claims priority to and the benefit of Korean Patent Application No. 10-2013-0049553, filed May 2, 2013, the disclosures of which are incorporated herein by reference in their entirety.

BACKGROUND

1. Field of the Invention

The present invention relates to a multi-block copolymer, a pressure-sensitive adhesive composition, a method of preparing a multi-block copolymer, a pressure-sensitive adhesive polarizing plate, and a liquid crystal display (LCD) device.

2. Discussion of Art

Recently, a variety of copolymer materials have been required, but a single polymer to meet such a requirement is difficult. Accordingly, attention to polymer alloys, that is, block copolymers, to obtain desired physical properties by mixing different polymers is increasing.

Methods of preparing a block copolymer, initiators for continuous activator regeneration atom transfer radical polymerization (ICAR ATRP), and activator regenerated by electron transfer atom transfer radical polymerization (ARGET-ATRP) are known.

As a use of the block copolymer, a pressure-sensitive adhesive field may be considered.

Particularly, to apply the block copolymer as an optical member such as a polarizing plate, a high molecular weight is required to ensure durability.

In Korean Unexamined Patent Publication Nos. 2010-0011179 and 2009-0072861, pressure-sensitive adhesive compositions to achieve such physical properties are disclosed.

However, the block copolymer is difficult to be synthesized at a high molecular weight due to its characteristic.

SUMMARY OF THE INVENTION

The present invention is directed to providing a multi-block copolymer, a pressure-sensitive adhesive composition, a method of preparing a multi-block copolymer, a pressure-sensitive adhesive polarizing plate, and an LCD device.

One aspect of the present invention provides a block copolymer and a pressure-sensitive adhesive composition.

The exemplary pressure-sensitive adhesive composition may include the multi-block copolymer. The term "multi-block copolymer" used herein refers to a copolymer including blocks of different polymerized monomers, and includes block copolymers having approximately 3 or more, 3 to 20, 3 to 15, or 3 to 10 blocks.

In one example, the multi-block copolymer may include a first block having a glass transition temperature of −10° C. or less, a second block having a glass transition temperature of 50° C. or more, and a third block having a glass transition temperature of −10° C. or less. The "glass transition temperature of a predetermined block" of the multi-block copolymer herein may refer to a glass transition temperature detected or calculated from a polymer formed only of monomers included in the block.

The glass transition temperature of the first block may be, for example, −20° C. or less, −25° C. or less, −30° C. or less, or −35° C. or less. The lower limit of the glass transition temperature of the first block is not particularly limited, and may be, for example, approximately −70° C., −65° C., −60° C., or −50° C.

The glass transition temperature of the second block may be, for example, 50° C. or more, 60° C. or more, 70° C. or more, 80° C. or more, or 90° C. or more. The upper limit of the glass transition temperature of the second block is not particularly limited, and may be, for example, approximately 130° C., 120° C., or 110° C.

In addition, the glass transition temperature of the third block may be, for example, −20° C. or less, −25° C. or less, −30° C. or less, or −35° C. or less. The lower limit of the glass transition temperature of the third block is not particularly limited, and may be, for example, approximately −70° C., −65° C., −60° C. or −50° C.

The multi-block copolymer having the first, second, and third blocks having a glass transition temperature within the range may have a suitable micro-phase separation structure in a pressure-sensitive adhesive, and the pressure-sensitive adhesive including such a phase separation structure may be suitably applied to an optical member such as a polarizing plate because of excellent durability regardless of a temperature and/or humidity.

The multi-block copolymer may be a crosslinkable copolymer having a crosslinkable functional group. The term "crosslinkable functional group" used herein may refer to a functional group capable of reacting with at least a functional group of a multifunctional crosslinking agent as a functional group provided to a side chain or terminal end of the copolymer. The crosslinkable functional group may be, for example, a hydroxyl group, a carboxyl group, an isocyanate group, or a glycidyl group, and preferably, a hydroxyl group, but an available crosslinkable functional group is not limited to the above examples.

When a crosslinkable functional group is included, the crosslinkable functional group may be included in blocks having a relatively lower glass transition temperature, that is, the first and/or third blocks. In addition, the crosslinkable functional group may be included in the second block.

When the crosslinkable functional group is included in the first and/or third blocks, durability of the pressure-sensitive adhesive may be excellently maintained regardless of a temperature and/or humidity due to a suitable cohesive strength and stress relaxation according to a temperature change, and thus, a pressure-sensitive adhesive composition capable of being suitably applied to an optical member such as a polarizing plate may be provided.

Types of monomers forming the first, second, and third blocks in the multi-block copolymer are not particularly limited as long as the above-described glass transition temperature is ensured by a combination of the monomers.

The first and/or third blocks may include, for example, a polymerization unit derived from 90 to 99.9 parts by weight of an acrylic acid ester monomer and 0.1 to 10 parts by weight of a copolymerizable monomer having a crosslinkable functional group. The unit "parts by weight" used herein may refer to a weight ratio between components. For example, the expression "the first and/or third blocks include(s) a polymerization unit derived from 90 to 99.9 parts by weight of an acrylic acid ester monomer and 0.1 to 10 parts by weight of a copolymerizable monomer having a crosslinkable functional group" may mean that a weight ratio (A:B) of the acrylic acid ester monomer (A) and the copolymerizable monomer (B) having a crosslinkable functional group, which form polymerization units of the first and/or third blocks, is 90 to 99.9:0.1 to 10. In such a range of the weight ratio, a physical property of the pressure-sensitive adhesive, for example, durability may be excellently maintained. In addition, the expression "the monomer is included in a polymer or a block as a polymerized unit" may mean that monomers undergo polymerization, thereby, forming a backbone, for example, a main chain or side chain of the polymer or block thereof.

The acrylic acid ester monomer forming the first and/or third blocks may be finally selected and used from all types of monomers, ensuring a glass transition temperature within the above-described range through copolymerization with the copolymerizable monomer in the monomer that may be included in a second block that will be described below. Although not particularly limited, in consideration of easy control of a glass transition temperature, the acrylic acid ester monomer forming the first block and/or third block may use an acrylic acid ester monomer such as alkyl acrylate, for example, alkyl acrylate having an alkyl group having 1 to 20, 1 to 16, 1 to 12, 1 to 8, or 1 to 4 carbon atoms.

A copolymerizable monomer has a crosslinkable functional group included in the first and/or third blocks, for example, a compound having a part to be copolymerized with another monomer included in a multi-block copolymer such as the acrylic acid ester monomer and the crosslinkable functional group. In the field of preparing a pressure-sensitive adhesive, various copolymerizable monomers having such a crosslinkable functional group are disclosed, and all of such monomers may be used in the polymer. For example, as a copolymerizable monomer having a hydroxyl group, a hydroxyalkyl(meth)acrylate such as 2-hydroxyethyl(meth)acrylate, 2-hydroxypropyl(meth)acrylate, 4-hydroxybutyl(meth)acrylate, 6-hydroxyhexyl(meth)acrylate, or 8-hydroxyoctyl(meth)acrylate, or a hydroxyalkyleneglycol(meth)acrylate such as 2-hydroxyethyleneglycol(meth)acrylate or 2-hydroxypropyleneglycol(meth)acrylate may be used; as a copolymerizable monomer having a carboxyl group, (meth)acrylic acid, 2-(meth)acryloyloxy acetic acid, 3-(meth)acryloyloxy propylic acid, 4-(meth)acryloyloxy butyric acid, an acrylic acid dimer, itaconic acid, maleic acid, or a maleic acid anhydride may be used, but the present invention is not limited thereto. As the first and/or third blocks are controlled to include a monomer having a crosslinkable functional group to continuously maintain a polymer chain terminal end that may react during polymerization, a multi-block copolymer with an increased molecular weight in the form of a tri-block copolymer, a penta-block copolymer or a hepta-block copolymer may be more effectively formed.

The second block may include a polymerized unit induced from, for example, a (meth)acrylic acid ester monomer. As the (meth)acrylic acid ester monomer, for example, alkyl (meth)acrylate may be used. In consideration of control of a cohesive strength, a glass transition temperature, and a pressure-sensitive adhesive property, an alkyl(meth)acrylate having an alkyl group having 1 to 20, 1 to 16, 1 to 12, 1 to 8, or 1 to 4 carbon atoms may be used. Here, the alkyl group may be a linear, branched, or cyclic type. Such a monomer may be methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl(meth)acrylate, isobornyl(meth)acrylate, isooctyl(meth)acrylate, isononyl(meth)acrylate or lauryl(meth)acrylate, and at least one or more thereof may be selected and used to ensure the glass transition temperature.

In consideration of easy control of the glass transition temperature, as a monomer forming the second block, a methacrylic ester monomer such as alkyl methacrylate among the monomers, for example, an alkyl methacrylate having an alkyl group having 1 to 20, 1 to 16, 1 to 12, 1 to 8, or 1 to 4 carbon atoms may be used.

The first block and/or second block, and/or the third block may further include another arbitrary comonomer, for example, when it is necessary to control a glass transition temperature, and the monomer may be included as a polymerization unit. As the comonomer, a nitrogen-containing monomer such as (meth)acrylonitrile, (meth)acrylamide, N-methyl(meth)acrylamide, N-butoxy methyl(meth)acrylamide, N-vinyl pyrrolidone, or N-vinyl caprolactam may be used; a styrene-based monomer such as styrene or methyl styrene; a glycidyl group-containing monomer such as glycidyl(meth)acrylate; or a carboxylic acid vinyl ester such as vinyl acetate may be used, but the present invention is not limited thereto. At least one or more suitable types of such comonomers may be included in a polymer. Such a comonomer may be included in a multi-block copolymer in a ratio of 20 parts by weight or less, or 0.1 to 15 parts by weight with respect to another monomer in each block copolymer.

The multi-block copolymer may include 25 to 85 parts by weight of the first block, 1 to 50 parts by weight of the second block, and 25 to 85 parts by weight of the third block. A weight ratio of the first, second, and third blocks is not particularly limited, but a pressure-sensitive adhesive composition having excellent durability and a pressure-sensitive adhesive may be provided by controlling a weight ratio of blocks in the above-described ratio. In another example, the multi-block copolymer may include 30 to 75 parts by weight of the first block, 5 to 25 parts by weight of the second block, and 30 to 75 parts by weight of the third block, but the present invention is not limited.

The multi-block copolymer of the present invention may have a structure in which the first block and the third block are coupled to both ends of the second block forming a hard region as long as it has the first, second, and third blocks, but the present invention is not particularly limited thereto.

Since the structure of the multi-block copolymer is controlled to have the above-described structure, thereby, simultaneously having a hard region and a soft region in one chain structure of the multi-block copolymer, the multi-block copolymer may simultaneously have physical and chemical crosslinking points through microphase separation, and an effectively high cohesive strength between chains due to the presence of the soft region outside a chain. Accordingly, the pressure-sensitive adhesive including the multi-block copolymer has an excellent physical property such as durability regardless of a temperature and humidity, and thus, a pressure-sensitive adhesive composition capable of being effectively applied to an optical member such as a polarizing plate may be provided.

In one example, the multi-block copolymer may have a number average molecular weight (Mn) of 160,000 or more, 170,000 or more, or 180,000 or more. The above-described number average molecular weight (Mn) may be measured by, for example, a method that will be described in the example using gel permeation chromatography (GPC). The upper limit of the number average molecular weight (Mn) of the multi-block copolymer may be, but is not particularly limited to, for example, approximately 1,000,000, 850,000, 600,000, 500,000, 400,000 or 300,000.

When the multi-block copolymer included in the pressure-sensitive adhesive composition according to the present invention is prepared by a method of preparing a multi-block copolymer that will be described below, termination of polymerization due to coupling termination may be effectively prevented during the preparation of the multi-block copolymer, and thus, the number average molecular weight (Mn) of the actually-prepared multi-block copolymer may be effectively increased compared to a theoretical number average molecular weight (Mn). The term "theoretical number average molecular weight (Mn)" used herein refers to a number average molecular weight (Mn) that may be expected in consideration of the characteristics of monomer components included in the block copolymer, and may be measured using the following Equation 1.

number of mols of monomer×number average molecular weight (Mn) of monomer×target conversion rate (%)/number of mols of ATRP initiator  [Equation 1]

In Equation 1, an ATRP initiator is an initiator having a structure of [C—X].

In the [C—X] structure, C is carbon, and X is selected from the group consisting of a halogen atom, CN, $SR_1$, $N_3$, S—C(=S)$R_2$ and S—C(=S)N($R_3$)$_2$. Here, $R_1$ to $R_3$ is each independently CN, an aryl having 6 to 20 carbon atoms, an alkyl having 1 to 20 carbon atoms, or an alkylthio having 1 to 20 carbon atoms, and in N($R_3$)$_2$, a 5- or 6-membered heterocyclic ring may be formed by coupling two $R_3$ groups, and the $R_1$ to $R_3$ may be substituted with at least one halogen.

A pressure-sensitive adhesive that has a desired durability by controlling the pressure-sensitive adhesive composition using a multi-block copolymer having the above-described range of the number average molecular weight (Mn) may be provided.

The pressure-sensitive adhesive composition of the present invention may include a multifunctional crosslinking agent. The crosslinking agent is a compound capable of realizing a crosslinking structure by reacting with the crosslinkable functional group, and for example, is a compound having 2 or more, 2 to 10, 2 to 8, 2 to 6, or 2 to 4 functional groups reacting with the crosslinkable functional group. Such a crosslinking agent may be included at 0.01 to 10 parts by weight, 0.015 to 5 parts by weight, 0.02 to 2.5 parts by weight or 0.025 to 1 part by weight with respect to 100 parts by weight of the multi-block copolymer. In such a range, suitable durability may be ensured under harsh conditions.

As the multifunctional crosslinking agent, a suitable type may be selected from conventional crosslinking agents such as an isocyanate crosslinking agent, an epoxy crosslinking agent, an aziridine crosslinking agent and a metal chelate crosslinking agent, in consideration of a type of a crosslinkable functional group included in the multi-block copolymer.

As the isocyanate crosslinking agent, a diisocyanate compound such as tolylene diisocyanate, xylene diisocyanate, diphenylmethane diisocyanate, hexamethylene diisocyanate, isoboron diisocyanate, tetramethylxylene diisocyanate or naphthalene diisocyanate may be used; or a reaction product between the diisocyanate compound and a polyol, for example, trimethylolpropane, or an isocyanurate addition product of the diisocyanate compound may be used; and as the epoxy crosslinking agent, at least one selected from the group consisting of ethyleneglycol diglycidylether, triglycidylether, trimethylolpropane triglycidylether, N,N,N',N'-tetraglycidyl ethylenediamine, and glycerin diglycidylether may be used; as the aziridine crosslinking agent, N,N'-toluene-2,4-bis(1-aziridinecarboxamide), N,N'-diphenylmethane-4,4'-bis(1-aziridinecarboxamide), triethylene melamine, bisisoprothaloyl-1-(2-methylaziridine) or tri-1-aziridinylphosphineoxide may be used, but the present invention is not limited thereto. As the metal chelate crosslinking agent, a compound in which a polyvalent metal such as aluminum, iron, zinc, tin, titan, antimony, magnesium and/or vanadium is coordinated to acetyl acetyl acetone or ethyl acetoacetate may be used, but the present invention is not limited thereto.

The pressure-sensitive adhesive composition may further include a silane coupling agent. As the silane coupling agent, for example, a silane coupling agent having a β-cyano group or an acetoacetyl group may be used. Such a silane coupling agent may allow a pressure-sensitive adhesive formed by a copolymer having a low molecular weight to have an excellent cohesive property and adhesive stability, and excellently maintain durability and reliability under heat resistant, and humidity and heat resistant conditions.

The silane coupling agent having a β-cyano group or an acetoacetyl group may be, for example, a compound represented by Formula 1 or 2.

$(R_1)_n Si(R_2)_{(4-n)}$  [Formula 1]

$(R_3)_n Si(R_2)_{(4-n)}$  [Formula 2]

In Formula 1 or 2, $R_1$ is a β-cyanoacetyl group or a β-cyanoacetylalkyl group, $R_3$ is an acetoacetyl group or an acetoacetylalkyl group, $R_2$ is an alkoxy group, and n is a number of 1 to 3.

In Formula 1 or 2, an alkyl group may be an alkyl group having 1 to 20, 1 to 16, 1 to 12, 1 to 8, or 1 to 4 carbon atoms, and such an alkyl group may be a linear, branched, or cyclic type.

In Formula 1 or 2, an alkoxy group may have 1 to 20, 1 to 16, 1 to 12, 1 to 8, or 1 to 4 carbon atoms, and such an alkoxy group may be a linear, branched, or cyclic type.

In Formula 1 or 2, n may be, for example, 1 to 3, or 1 to 2.

As the compound of Formula 1 or 2, for example, acetoacetylpropyl trimethoxy silane, acetoacetylpropyl triethoxy silane, β-cyanoacetylpropyl trimethoxy silane or β-cyanoacetylpropyl triethoxy silane may be used, but the present invention is not limited thereto.

The silane coupling agent in the pressure-sensitive adhesive composition may be included at 0.01 to 5 parts by weight or 0.01 to 1 parts by weight with respect to 100 parts by weight of the multi-block copolymer, and a desired durability may be effectively provided to the pressure-sensitive adhesive in the above-described range.

The pressure-sensitive adhesive composition may further include a pressure-sensitive adhesive providing agent when needed. As the pressure-sensitive adhesive providing agent, for example, one or a mixture of at least two of a hydrocarbon resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, or a polymerized rosin resin or polymerized rosin ester resin may be used, but the present invention is not limited. The pressure-sensitive adhesive providing agent may be included in the pressure-sensitive adhesive composition at 100 parts by weight or less with respect to 100 parts by weight of the multi-block copolymer.

The pressure-sensitive adhesive composition may further include at least one additive selected from the group consisting of a curing agent, a UV stabilizer, an antioxidant, a coloring agent, a reinforcing agent, a filler, a foaming agent, a surfactant, and a plasticizer when needed.

The present invention also provides a method of preparing the multi-block copolymer.

In one example, the method of preparing a multi-block copolymer may include polymerizing a polymerizable monomer in the presence of a catalyst, a ligand coordinated with the catalyst, and an initiator having at least two bonds of Formula 3 in a structure.

$$C—X \quad \text{[Formula 3]}$$

In Formula 3, C is a carbon atom, X is selected from the group consisting of a halogen atom, CN, $SR_1$, $N_3$, $S—C(=S)R_2$, and $S—C(=S)N(R_3)_2$.

Here, $R_1$ to $R_3$ are each independently CN; an aryl having 6 to 20 carbon atoms; an alkyl having 1 to 20, 1 to 16, 1 to 12, or 1 to 8 carbon atoms; or an alkylthio having 1 to 20, 1 to 16, 1 to 12 or 1 to 8. In the case of an $N(R_3)_2$ group, a 5- or 6-membered heterocyclic ring may be formed by coupling two $R_3$ groups. In addition, the $R_1$ to $R_3$ may be substituted with at least one halogen.

The polymerizing of the polymerizable monomer in the presence of the catalyst, the ligand coordinated with the catalyst, and the initiator having at least two bonds of Formula 3 in the structure may be mixing components for polymerization by living radical polymerization (LRP) and performing polymerization.

The polymerizable monomer used in the method of preparing a multi-block copolymer may include a compound represented by Formula 4, but the present invention is not particularly limited.

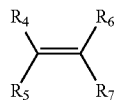

[Formula 4]

In Formula 4, $R_4$ and $R_5$ are each independently selected from the group consisting of an alkyl having 1 to 20 carbon atoms, an alkenyl having 2 to 10 carbon atoms, an alkynyl having 2 to 10 carbon atoms, a cycloalkyl having 3 to 8 carbon atoms, a 3- to 20-membered heterocyclyl, an aryl having 6 to 20 carbon atoms, $C(=Y)R_8$, $C(=Y)NR_9R_{10}$, and $YC(=Y)R_{11}$.

Here, Y is $NR_{12}$ or O, $R_8$ is an alkyl having 1 to 20 carbon atoms, an alkoxy having 1 to 20 carbon atoms, an aryloxy having 6 to 20 carbon atoms, or a 3- to 20-membered heterocyclyl-oxy, $R_9$ and $R_{10}$ are independently hydrogen or an alkyl having 1 to 20 carbon atoms, or $R_9$ and $R_{10}$ are coupled together to form an alkylene group having 2 to 5 carbon atoms, thereby forming a 3- to 6-membered ring, $R_{11}$ and $R_{12}$ are independently hydrogen, an alkyl having 1 to 20 carbon atoms, or an aryl having 6 to 20 carbon atoms, $R_6$ and $R_7$ are independently selected from hydrogen and an alkyl having 1 to 6 carbon atoms, or $R_4$ and $R_6$ are coupled, thereby forming a group of formula $(CH_2)n$ or a group of formula $C(=O)—Y—C(=O)$ that may be substituted with 1 to 2n halogen atoms or an alkyl group having 1 to 4 carbon atoms.

Here, n is 2 to 6, and Y is the same as defined above.

In addition, the term "aryl" used herein may refer to phenyl, naphthyl, phenanthryl, phenalenyl, anthracenyl, triphenylenyl, fluoranthenyl, pyrenyl, pentacenyl, chrysenyl, naphthacenyl, hexaphenyl, picenyl, and perilenyl, and each hydrogen atom in the compound may be substituted with an alkyl having 1 to 20 carbon atoms, an alkenyl having 2 to 20 carbon atoms, an alkynyl having 1 to 20 carbon atoms, an alkoxy having 1 to 6 carbon atoms, an alkylthio having 1 to 6 carbon atoms, a cycloalkyl having 3 to 8 carbon atoms, phenyl, $NH_2$, an alkylamino having 1 to 6 carbon atoms, a dialkylmino having 1 to 6 carbon atoms, and an alkyl group having 1 to 4 carbon atoms (in this case, the definition of the "aryl" may be applied to an aryl group of the "aryloxy" and "aralkyl."). In addition, the phenyl may be substituted once to five times with one of the substituents, and the naphthyl may be substituted once to seven times (In this case, when an arbitrary aryl group is substituted, substitution may be performed once to three times). More preferably, the "aryl" is phenyl substituted once to three times with a substituent selected from the group consisting of phenyl or phenyl substituted with naphthyl once to five times, an alkyl having 1 to 6 carbon atoms, and alkoxy and phenyl having 1 to 4 carbon atoms. The most preferably, the "aryl" is phenyl, tolyl, and methoxyphenyl.

In addition, the term "heterocyclyl" used herein is pyridyl, furyl, pyrrolyl, thienyl, imidazolyl, pyrazolyl, pyrazinyl, pyrimidinyl, pyridazinyl, pyranyl, indolyl, isoindolyl, indazolyl, benzofuryl, isobenzofuryl, benzothienyl, isobenzothienyl, chromenyl, xanthenyl, furynyl, phtheridinyl, quinolyl, isoquinolyl, phthalazinyl, quinazolinyl, quinoxalinyl, naphthylidinyl, phenoxathiinyl, carbazolyl, cinnolinyl, phenanthridinyl, acridinyl, 1,10-penanthrolinyl, phenazinyl, phenoxazinyl, phenothiazinyl, oxazolyl, thiazolyl, isoxazolyl, isothiazolylpyridyl, or a hydrogenated form of the compound. Preferably, the heterocyclyl group is pyridyl, furyl, pyrrolyl, thienyl, imidazolyl, pyrazolyl, pyrazinyl, pyrimidinyl, pyridazinyl, pyranyl, or indolyl, and most preferably, the heterocyclic group is pyridyl. Accordingly, suitable vinyl heterocycle for the monomer in the present invention is 2-vinyl pyridine, 6-vinyl pyridine, 2-vinyl pyrrole, 5-vinyl pyrrole, 2-vinyl oxazole, 5-vinyl oxazole, 2-vinyl thiazole, 5-vinyl thiazole, 2-vinyl imidazole, 5-vinyl imidazole, 3-vinyl pyrazole, 5-vinyl pyrazole, 3-vinyl pyridazine, 6-vinyl pyridazine, 3-vinyl isoxazole, 3-vinyl isothiazole, 2-vinyl pyrimidine, 4-vinyl pyrimidine, 6-vinyl pyrimidine, or arbitrary vinyl pyrazine, and, preferably, 2-vinyl pyridine. The above-described vinyl heterocycle may include at least one alkyl or alkoxy group having 1 to 6 carbon atoms, a cyano group or an ester group on a vinyl group or a heterocyclyl group. However, the above-described vinyl heterocycle is preferably on a heterocyclyl group. In addition, when not substituted, the position of the vinyl heterocycle containing an NH group may be protected with a conventional blocking group or protecting group [for example, an alkyl group having 1 to 6 carbon atoms, an acyl group of formula $R_{10}CO$ (here, $R_{10}$ is an alkyl having 1 to 20 carbon atoms, phenyl substituted with an alkenyl having 2 to 20 carbon atoms, an alkynyl having 2 to 10 carbon atoms or an alkyl group having 1 to 4 carbon atoms, or an aralkyl (an aryl group is phenyl or substituted phenyl, and an alkyl group is aryl-substituted alkyl having 1 to 6 carbon atoms), etc.]. In addition, the definition of the "heterocyclyl" may also be applied to a heterocyclyl group in "heterocyclyloxy" and "heterocyclic ring."

In addition, in another example, the polymerizable monomer may be at least one selected from the group consisting of (meth)acrylate, styrene, (meth)acrylonitrile, (meth)acrylamide and vinyl acetate, but the present invention is not limited thereto In one example, the catalyst may include a compound represented by Formula 5.

$$M^{n+}X_n \quad \text{[Formula 5]}$$

In Formula 5, $M^{n+}$ may be selected from the group consisting of $Cu^{+1}$, $Cu^{+2}$, $Fe^{+2}$, $Fe^{+3}$, $Ru^{+2}$, $Ru^{+3}$, $Cr^{+2}$, $Cr^{+3}$, $Mo^{+2}$, $Mo^{+3}$, $W^{+2}$, $W^{+3}$, $Mn^{+3}$, $Mn^{+4}$, $Rh^{+3}$, $Rh^{+4}$, $R^{+2}$, $R^{+3}$, $Co^+$, $Co^{+2}$, $V^{+2}$, $V^{+3}$, $Zn^+$, $Zn^{+2}$, $Au^+$, $Au^{+2}$, $Ag^+$, and $Ag^{+2}$, X is a halogen atom, and n is an integer of 1 to 4 as a formal charge of a metal.

In Formula 5, $M^{n+}$ is preferably $Cu^{+1}$, $Cu^{+2}$, $Fe^{+2}$, $Fe^{+3}$, $Mn^{+3}$, $Mn^{+4}$, $Zn^+$ and $Zn^{+2}$, but the present invention is not limited thereto.

The catalyst may be, for example, $Cu(II)Cl_2$, $Cu(II)Br_2$, $Cu(II)I_2$, $Fe(II)Cl_2$, $Fe(III)Cl_3$, or a mixture thereof, but preferably, $Cu(II)Cl_2$, $Cu(II)Br_2$, $Cu(II)I_2$, or a mixture thereof.

In addition, a content of the catalyst may be 0.001 to 1 part by weight, 0.005 to 0.75 parts by weight or 0.01 to 0.5 parts by weight with respect to 100 parts by weight of the polymerizable monomer. When the content of the catalyst is less than 0.001 parts by weight, a reaction is greatly delayed, and when the content of the catalyst is more than 1 part by weight, a molecular weight of the polymerized copolymer may be excessively low.

In addition, as the catalyst, various types of catalysts known in the art may be used. For example, the catalyst may be, but is not limited to, a powder, a wire, or a mesh.

The ligand is not particularly limited as long as it is coupled with the catalyst and thus, may be used in polymerization.

In one example, the ligand may be a ligand having at least one nitrogen, oxygen, phosphorus or sulfur atom that may be coordinated with a catalyst through a σ-bond, or a ligand containing at least two carbon atoms that may be coordinated with a catalyst through a π-bond, but the present invention is not limited, and specifically, a tris(2-pyridylmethyl)amine (TPMA) ligand may be used.

A content of the ligand may be 100 to 2000 parts by weight, 150 to 1000 parts by weight, or 200 to 500 parts by weight with respect to 100 parts by weight of the catalyst. When the content of the ligand is less than 100 parts by weight, metal complexes formed by binding with a catalyst are so few that a reaction is performed very slowly or not performed. When the content of the ligand is more than 2000 parts by weight, a production cost is increased, and coloring occurs due to a use of excessive ligands.

The method of preparing a multi-block copolymer may include a compound containing at least two halogen atoms as an initiator.

In one example, the initiator may include a compound having at least two units represented by Formula 6.

  [Formula 6]

In Formula 6, $R_{13}$ and $R_{14}$ are hydrogen or an alkyl having 1 to 4 carbon atoms, and X is a halogen atom.

In addition, in one example, the initiator may be a compound represented by Formula 7.

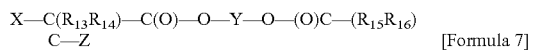  [Formula 7]

In Formula 7, $R_{13}$ to $R_{16}$ are each independently hydrogen or an alkyl having 1 to 8 carbon atoms, X and Z are each independently a halogen atom, and Y is an alkylene having 1 to 8 carbon atoms.

In addition, the initiator includes compounds having at least 2, 3, 4, or 5 units represented by Formula 6 as long as a compound has at least two halogen groups, but the present invention is not limited thereto. The upper limit of the number of the initiators is not particularly limited, but the number of the initiators may be 8, 7, 6, or 5. The method of preparing a multi-block copolymer according to the present invention may continuously maintain an increasing reaction with respect to remaining monomers since an active state of a halogen group is still maintained at a terminal end of a polymer although coupling termination occurs, compared to conventional living polymerization. Accordingly, compared to another method of preparing a multi-block copolymer, a multi-block copolymer having a short production time and a high conversion ratio of a monomer due to a one-pot process may be provided.

The initiator may be, but is not limited to, ethylene bis(2-bromoisobutyrate), 1,1,1-tris(2-bromoisobutyryloxymethyl) ethane, pentaerythritol tetrakis(2-bromoisobutyrate), dipentaerythritol hexakis (2-bromoisobutyrate), or a mixture thereof.

A content of the initiator may be 0.01 to 5 parts by weight, 0.05 to 4.5 parts by weight, or 0.1 to 4 parts by weight with respect to 100 parts by weight of the polymerizable monomer. When the content of the initiator is less than 0.01 parts by weight, an initial initiation speed is delayed, and when the content of the initiator is more than 5 parts by weight, initiation may be actively performed, but a molecular weight may be excessively reduced.

The example method of preparing a multi-block copolymer may include additionally adding a polymerizable monomer.

In one example, the polymerization of a polymerizable monomer in the method of preparing a multi-block copolymer may include preparing a macroinitiator by polymerizing a polymerizable monomer in the presence of an initiator, a catalyst, a ligand, and a reducing agent; and may include preparing a multi-block copolymer by polymerizing a polymerizable monomer in the presence of the macroinitiator, the catalyst, the ligand, and the reducing agent.

The polymerizable monomer may use a conventional monomer without particular limitation, and for example, a polymerizable monomer represented by Formula 4.

The method of preparing a multi-block copolymer may include oxidation-reduction, and to this end, a reducing agent may be included. The reducing agent is present in a solid state in a reaction solution, but may be dissolved in the ligand, and reacted with a highly-oxidized metal compound (inactive state) to be reduced into a lowly-oxidized metal compound (active state). In addition, the reducing agent may participate in the reaction by being changed into the active state.

In addition, the reducing agent may include a material having electron-donating ability capable of reducing Cu(II) into Cu(I), that is, an organic or inorganic reducing agent capable of donating electrons, in consideration of electron-donating ability.

In one example, the organic reducing agent may be, but is not limited to, for example, at least one selected from the group consisting of peroxides, azo compounds, ascorbic acids, monosaccharide compounds, phenol compounds, amine compounds, and hydrazine compounds.

The peroxide may be, but is not limited to, for example, benzoyl peroxide, 1,1-bis(tert-butylperoxy)-3,3,5-triethylcyclohexane, tert-butylperoxyacetate, tert-butylperoxybenzoate, tert-butyl peroxy-2-ethylhexanoate, tert-butyl peroxyisopropylcarbonate, di-2-ethylhexylperoxy dicarbonate, diisopropylperoxy dicarbonate, di-3-methoxybutylperoxy dicarbonate, di-3,3,5-trimethylhexanoyl peroxide, di-tert-butyl peroxide, lauroyl peroxide, dicumylperoxide, methyl etherketone peroxide, butyl hydroperoxide, or cumyl hydroperoxide.

In one example, the azo compound may be, but is not limited to, azodicarbonamide, azobenzene, azobisisobutyronitrile 2,2'-azobis(2-methylpropionitrile) 2,2'-azobis(4-methoxy-2,4-dimethyl valeronitrile), dimethyl 2,2'-azobis(2-methyl propionate), 2,2'-azobis(N-cyclohexyl-2-methyl propionate), 2,2-azobis(2,4-dimethyl valeronitrile), 2,2'-azobis(2-methyl butyronitrile), 2,2'-azobis[N-(2-prophenyl)-2-methylpropionate], 2,2'-azobis(N-butyl-2-methyl propionate), 2,2'-azobis[N-(2-prophenyl)-2-methyl propionate], 1,1'-azobis(cyclohexane-1-carbonitrile), or 1-[(cyano-1-methylethyl)azo]formamide.

The ascorbic acid may be, but is not limited to, for example, L-ascorbic acid-2-O-phosphate, L-ascorbic acid-2-O-sulfate, 2-O-octadecyl-ascorbic acid, or ascorbic acid-2-methylester.

In one example, the monosaccharide compound may be a triose such as dihydroxyacetone or glyceraldehyde; a tetrose such as etythrulose, erythryose or threose; a pentose such as ribulose, xylulose, ribose, arabinose, xylose, lyxose, or deoxyribose; a hexose such as psicose, fructose, sorbose, tagatose, allose, altrose, glucose, mannose, gulose, idose, galactose, talose, fucose, fuculose, or rhamnose; and a heptose such as sedoheptulose, and an octose or a nonose such as neuraminic acid may also be used.

The phenol compound may use a variety of known compounds containing a phenol group, for example, 4-propylphenol, 4-butylphenol, 4-tert-butylphenol, 4-pentylphenol, 4-tert-pentylphenol, 4-hexylphenol, 4-tert-octylphenol, 4-phenylphenol, nonylphenol, 2,6-di-tert-butyl-p-cresol, 2,4,6-tri-tert-butyl phenol, 2,6-di-phenyl phenol, 2,4-di-tert-butyl phenol, 2-tert-butyl-4-methyl phenol 4-(3,4-dihydroxyphenoxy)benzene-1,2-diol, 2-bromo-4,5-dihydroxyphenyl (3,4-dihydroxyphenyl)ether, bis(2-bromo-4,5-dihydroxyphenyl)ether, bis(2,3-dibromo-4,5-dihydroxyphenyl)ether, bis(3,4-dihydroxyphenyl) methanone, bis(3-bromo-4,5-dihydroxyphenyl)methan one, (3-bromo-4,5-dihydroxyphenyl)(2,3-dibromo-4,5-dihydroxyphenyl)methan one, 4-(3,4-dihydroxyphenethyl)benzene-1, 2-diol, 2,2'-dibromo-4,4',5,5'-tetrahydroxybibenzyl, or 2,2', 3-tribromo-4,4',5,5'-tetrahydroxybibenzyl, but the present invention is not limited thereto.

Here, the amine compound may be, for example, dimethylamine, ethylamine, diethylamine, triethylamine, diphenylamine, ethanolamine, tert-butylamine, cyclohexylamine, 4,4-dimethylcyclohexaneamine, N,N-dimethylpropylamine, N-ethyl-N-methylcyclohexylamine, N-methyl-2-pentaneamine, 2-aminobutanoic acid, 3-aminobutanoic acid, 1-amino-3-pentanone, 2-methylaminoethanol, 2,4-diaminobenzoic acid, 4-amino-2-butanone, aniline, aminoethane, 2-aminopentane, 1-methylaminopropane, or 1-(ethylmethylamino)propane, but the present invention is not limited thereto.

The hydrizine compound may be, for example, hydrazine, hydrazine hydrochloride, phenylhydrazine, hydrazine sulfate, or hydrazobenzene, but is not limited thereto.

The inorganic reducing agent may include, for example, at least one of tin dioctanoate and a zero-valent metal.

A content of the reducing agent may be 10 to 3000 parts by weight, 50 to 2000 parts by weight, or 100 to 1000 parts by weight with respect to 100 parts by weight of the catalyst. When the content of the reducing agent is less than 10 parts by weight, the catalyst may not be sufficiently reduced, and when the content of the reducing agent is more than 1000 parts by weight, a separate purification process performed by adding a large amount of the reducing agent may be needed.

A time to add the reducing agent is not particularly limited. However, it is preferable that the reducing agent when needed may be added at the same time as the initiation of the polymerization during the method of preparing a multi-block copolymer according to the present invention, and may be further added during the reaction. In addition, when it is determined that the activity of the catalyst is lost in consideration of a half-life of the utilized reducing agent, the reducing agent is added repeatedly, for example, at least once, to maintain the activity of the catalyst.

In the example method of preparing a multi-block copolymer, the polymerization of a monomer may be performed at 25 to 160° C., 30 to 145° C., or 35 to 130° C. In addition, the polymerization time may be 0.5 to 60 hours, 5 to 50 hours, or 10 to 40 hours.

The method of preparing a multi-block copolymer according to the present invention may be performed by bulk polymerization without a solvent, or performed in the presence of a reaction solution in which a solvent and a polymerizable monomer are mixed.

In one example, when the method of preparing a multi-block copolymer is performed in the presence of the reaction solution, the solvent may be, but is not limited to, benzene, toluene, anisole, ethyl acetate, acetone, methyl ethyl ketone, acetonitrile, N,N-dimethyl formamide, methanol, ethanol, isopropanol, or a mixture thereof.

In addition, the method of preparing a multi-block copolymer may further include terminating the polymerization reaction after the polymerization of the polymerizable monomer. Through the termination of the reaction, after the polymerization, the polymerized mixture may be exposed to or in contact with oxygen to prevent the reaction from being performed any more.

The multi-block copolymer prepared by the method of preparing a multi-block copolymer according to the present invention may have an excellent cohesive strength when included in a pressure-sensitive adhesive resin, and form a network structure during curing, and therefore, may exhibit excellent durability regardless of a temperature and humidity when applied to a pressure-sensitive adhesive composition.

Another aspect of the present invention provides a pressure-sensitive adhesive polarizing plate, which includes a polarizer, and a pressure-sensitive adhesive layer present on one or both surfaces of the polarizer and formed from a pressure-sensitive adhesive composition including the multi-block copolymer.

The pressure-sensitive adhesive layer may include, for example, the pressure-sensitive adhesive composition having a crosslinked structure.

A type of the polarizer included in the polarizing plate is not particularly limited, and thus, a general type known in the art such as a polyvinylalcohol-based polarizer may be employed without limitation.

The polarizer is a functional film capable of extracting only light vibrating in one direction from incident light vibrating in various directions. Such a polarizer may be formed by adsorbing and aligning a dichroic pigment on a polyvinylalcohol-based resin film. A polyvinylalcohol-based resin constituting the polarizer may be obtained by, for example, gelating a polyvinylacetate-based resin. In this case, in the polyvinylacetate-based resin that may be used herein, a copolymer of vinyl acetate and a different monomer that may be copolymerized with the vinyl acetate, in addition to a homopolymer of the vinyl acetate, may be included. Here, examples of the monomers that may be copolymerized with vinyl acetate may include, but are not limited to, one or a mixture of at least two of unsaturated carbonic acids, olefins, vinyl ethers, unsaturated sulfonic acids or acrylamides having an ammonium group. A degree of gelation of the polyvinyl alcohol-based resin may be usually approximately 85 to 100 mol %, and, preferably, 98 mol % or more. The polyvinyl alcohol-based resin may be further modified, and, for example, polyvinylformal or polyvinylacetal modified with aldehydes may be used. In addition, a degree of the polymerization of the polyvinyl alcohol-based resin may be usually approximately 1,000 to 10,000 or 1,500 to 5,000.

The polarizer may be manufactured through a process of elongating a polyvinyl alcohol-based resin film (e.g., uniaxial elongation), a process of staining the polyvinyl alcohol-based resin film with a dichroic pigment and adsorbing the dichroic pigment, a process of treating the polyvinyl alcohol-based resin film on which the dichroic pigment is adsorbed with a boric acid aqueous solution, and a process of washing the polyvinyl alcohol-based resin film after the treatment of the boric acid aqueous solution. Here, as the dichroic pigment, iodine or a dichroic organic dye may be used.

The polarizing plate may further include a protective film attached to one or both surfaces of the polarizer, and, in this case, the pressure-sensitive adhesive layer may be formed on one surface of the protective film. A type of the protective film is not particularly limited. The protective film may be, for example, a cellulose-based film such as a triacetyl cellulose (TAC) film; a polyester-based film such as a polycarbonate film or a poly(ethylene terephthalet) (PET); a polyethersulfone-based film; or a film formed of one or in a stacked structure of at least two of a polyethylene film, a polypropylene film, and a polyolefin-based film manufactured using a resin having a cyclic or norbornene structure, or an ethylene-propylene copolymer, and preferably, a cellulose-based film such as a TAC film.

The polarizing plate may further include at least one functional layer selected from the group consisting of a protective layer, a reflective layer, an anti-glare layer, a phase retardation plate, a wide viewing angle compensating film, and a brightness enhancing film.

In the present invention, a method of forming a pressure-sensitive adhesive layer on the polarizing plate is not particularly limited, and, for example, the method may include directly coating and curing the pressure-sensitive adhesive composition to realize a crosslinking structure, or coating and curing the pressure-sensitive adhesive composition on a releasing-treated surface of a releasing film to form a crosslinking structure, and then transferring the pressure-sensitive adhesive composition.

A method of coating a pressure-sensitive adhesive composition may be, but is not particularly limited to, for example, coating a pressure-sensitive adhesive composition with a conventional means such as a bar coater.

During the coating process, a multifunctional crosslinking agent included in the pressure-sensitive adhesive composition is preferably controlled to prevent a crosslinking reaction at a functional group in terms of an uniform coating process, and therefore, the crosslinking agent may form a crosslinking structure during curing and aging processes after coating to enhance a cohesive strength, a pressure-sensitive adhesive property and cuttability of a pressure-sensitive adhesive.

The coating process may also be performed after sufficiently removing a volatile component in the pressure-sensitive adhesive composition or a bubbling component such as a reaction residue, and therefore, it may prevent a decrease in a modulus of elasticity due to excessively low crosslinking density or molecular weight of the pressure-sensitive adhesive, and a scatterer that may be formed therein due to growing bubbles between a glass plate and a pressure-sensitive adhesive layer at a high temperature.

Still another aspect of the present invention provides a display device, for example, an LCD device. The display device may include, for example, the above-described optical member or polarizing plate. When the display device is an LCD, the device may include a liquid crystal panel and an optical member including the polarizing plate attached to one or both surfaces of the liquid crystal panel. The polarizing plate may be attached to a liquid crystal panel by a pressure-sensitive adhesive formed from the above-described pressure-sensitive adhesive composition through crosslinking. As a liquid crystal panel applied to the LCD, for example, a known panel such as a passive matrix-type panel such as a twisted nematic (TN), super twisted nematic (STN), ferroelectric (F), or polymer dispersed (PD) panel, an active matrix-type panel such as a two or three terminal panel, an in-plane switching (IPS) panel or a vertically-aligned (VA) panel may be used without limitation.

In addition, types of other components constituting a display device, for example, upper and lower substrates such as a color filter substrate or an array substrate in an LCD are not particularly limited, either, and any components known in the art may be employed without limitation.

DETAILED DESCRIPTION OF EXEMPLARY EMBODIMENTS

Hereinafter, exemplary embodiments of the present invention will be described in detail. However, the present invention is not limited to the embodiments disclosed below, but may be implemented in various forms. The following embodiments are described in order to enable those of ordinary skill in the art to embody and practice the present invention.

Although the terms "first," "second," etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or groups thereof, but do not preclude the presence or addition of one or more other features, integers, steps, operations, elements, components, and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

Hereinafter, the present invention will be described in further detail with reference to Examples and Comparative Examples. However, the Examples and Comparative Examples are merely examples, and are not a limit to the technical scope of the present invention.

Example 1

Preparation of Block Copolymer Using Compound Containing at Least Two Halogen Atoms 0.1 g of ethylene bis(2-bromoisobutyrate) and 17.3 g of methyl methacrylate were mixed with 17.3 g of ethyl acetate (EAc) to prepare a mixture. Afterward, 0.003 g of $CuBr_2$ as a catalyst and 0.008 g of tris(2-pyridylmethyl)amine (TPMA) as a ligand reacted to form Cu(II), and 0.028 g of 2,2'-azobis-(2,4-dimethyl valeronitrile) (V-65) was added to the mixture and mixed together. A reaction flask containing the mixture was stopped with a plug, and purged with nitrogen at approximately 25° C. for approximately 30 minutes. Dissolved oxygen was removed through bubbling. The reaction mixture from which oxygen was removed was dipped in an oil bath at approximately 67° C. to initiate a reaction. When the monomer conversion ratio became approximately 75%, a mixture of 181 g of butyl acrylate (BA), 1.8 g of hydroxy butyl acrylate (HBA), and 183 g of EAc, which had been bubbled with nitrogen, was added in the presence of nitrogen. Afterward, after 0.007 g of $CuBr_2$ as a catalyst from which oxygen was removed, 0.018 g of TPMA as a ligand and 0.034 g of V-65 were added into the reaction flask, and a chain extension reaction was executed. When the monomer conversion ratio reached 80% or more, the reaction was terminated by exposing the mixture to oxygen and diluting the mixture in a suitable solvent, and thereby, a multi-block copolymer including a second block polymerized with methyl methacrylate, and first and third blocks polymerized with butyl acrylate and hydroxybutyl acrylate was prepared. However, the V-65 was suitably added until the reaction ended in consideration of its half life.

Example 2

Preparation of Block Copolymer Using Compound Containing at Least Two Halogen Atoms 0.1 g of ethylene bis(2-bromoisobutyrate), 13 g of methyl methacrylate, and 5.6 g of butyl methacrylate were mixed with 7.9 g of EAc to prepare a mixture. Afterward, 0.003 g of $CuBr_2$ as a catalyst and 0.008 g of TRMA reacted to form Cu(II), and 0.023 g of V-65 was added to the mixture and mixed together. A reaction flask containing the mixture was stopped with a plug, and purged with nitrogen at approximately 25° C. for approximately 30 minutes. Dissolved oxygen was removed through bubbling. The reaction mixture from which oxygen was removed was dipped in an oil bath at approximately 67° C. to initiate a reaction. When the monomer conversion ratio became approximately 75%, a mixture of 180 g of BA, 1.8 g of HBA, and 125 g of EAc, which had been bubbled with nitrogen, was added in the presence of nitrogen. Afterward, after 0.007 g of $CuBr_2$ as a catalyst from which oxygen was removed, 0.018 g of TPMA as a ligand, and 0.038 g of V-65 were added into the reaction flask, and a chain extension reaction was executed. When the monomer conversion ratio reached 80% or more, the reaction was terminated by exposing the mixture to oxygen and diluting the mixture in a suitable solvent, and thereby, a multi-block copolymer including a second block polymerized with methyl methacrylate and butyl acrylate, and first and third blocks polymerized with butyl acrylate and hydroxybutyl acrylate was prepared. However, the V-65 was suitably added until the reaction ended in consideration of its half life.

Comparative Example 1

Preparation of Block Copolymer Using Compound Containing One Halogen Atom 0.29 g of ethyl 2-bromoisobutyrate (EBiB) and 44.3 g of methyl methacrylate were mixed with 17 g of EAc to prepare a mixture. Afterward, 0.0048 g of $CuBr_2$ as a catalyst and 0.0123 g of tris(2-pyridylmethyl)amine (TPMA) as a ligand reacted to form Cu(II), and 0.08 g of V-65 was added to the mixture and mixed together. A reaction flask containing the mixture was stopped with a plug, and purged with nitrogen at approximately 25° C. for approximately 30 minutes. Dissolved oxygen was removed through bubbling. The reaction mixture from which oxygen was removed was dipped in an oil bath at approximately 67° C. to initiate a reaction. When the monomer conversion ratio became approximately 75%, a mixture of 151 g of BA, 4.7 g of HBA and 116 g of EAc, which had been bubbled with nitrogen, was added in the presence of nitrogen. Afterward, after 0.005 g of $CuBr_2$ as a catalyst from which oxygen was removed, 0.014 g of TPMA as a ligand and 0.07 g of V-65 were added into the reaction flask, and a chain extension reaction was executed. When the monomer conversion ratio reached 80% or more, the reaction was terminated by exposing the mixture to oxygen and diluting the mixture in a suitable solvent, and thereby, a multi-block copolymer including a second block polymerized with methyl methacrylate, and a first block polymerized with butyl acrylate and hydroxybutyl acrylate was prepared. However, the V-65 was suitably added until the reaction ended in consideration of its half life.

Comparative Example 2

Preparation of Block Copolymer Using Compound Containing One Halogen Atom 0.14 g of EBiB and 21.3 g of methyl methacrylate were mixed with 21 g of EAc to prepare a mixture. Afterward, 0.0023 g of $CuBr_2$ as a catalyst and 0.0098 g of TPMA as a ligand reacted to form Cu(II), and 0.03 g of V-65 was added to the mixture and mixed together. A reaction flask containing the mixture was stopped with a plug, and purged with nitrogen at approximately 25° C. for approximately 30 minutes. Dissolved oxygen was removed through bubbling. The reaction mixture from which oxygen was removed was dipped in an oil bath at approximately 67° C. to initiate a reaction. When the monomer conversion ratio became approximately 75%, a mixture of 222 g of BA, 6.8 g of HBA and 145 g of EAc, which had been bubbled with nitrogen, was added in the presence of nitrogen. Afterward, after 0.01 g of $CuBr_2$ as a catalyst from which oxygen was removed, 0.04 g of TPMA as a ligand and 0.08 g of V-65 were added into the reaction flask, and a chain extension reaction was executed. When the monomer conversion ratio reached 80% or more, the reaction was terminated by exposing the reaction mixture to oxygen and diluting the reaction mixture in a suitable solvent, and thereby, a multi-block copolymer including a second block polymerized with methyl methacrylate, and a first block polymerized with butyl acrylate and hydroxybutyl acrylate was prepared. However, the V-65 was suitably added until the reaction ended in consideration of its half life.

Comparative Example 3

Preparation of Block Copolymer Using Compound Containing One Halogen Atom 0.06 g of EBiB, 12.6 g of methyl methacrylate and 5.4 g of butyl methacrylate were mixed with 7.1 g of EAc to prepare a mixture. Afterward, 0.003 g of CuBr$_2$ as a catalyst and 0.08 g of TPMA as a ligand reacted to form Cu(II), and 0.08 g of V-65 was added to the mixture and mixed together. A reaction flask containing the mixture was stopped with a plug, and purged with nitrogen at approximately 25° C. for approximately 30 minutes. Dissolved oxygen was removed through bubbling. The reaction mixture from which oxygen was removed was dipped in an oil bath at approximately 67° C. to initiate a reaction. When the monomer conversion ratio became approximately 75%, a mixture of 180 g of BA, 1.8 g of HBA and 118 g of EAc, which had been bubbled with nitrogen, was added in the presence of nitrogen. Afterward, after 0.007 g of CuBr$_2$ as a catalyst from which oxygen was removed, 0.02 g of TPMA as a ligand and 0.04 g of V-65 were added into the reaction flask, and a chain extension reaction was executed. When the monomer conversion ratio reached 80% or more, the reaction was terminated by exposing the reaction mixture to oxygen and diluting the reaction mixture in a suitable solvent, and thereby, a multi-block copolymer including a second block polymerized with methyl methacrylate and butyl acrylate and a first block polymerized with butyl acrylate and hydroxybutyl acrylate was prepared. However, the V-65 was suitably added until the reaction ended in consideration of its half life.

Types of the copolymers prepared in Examples 1 and 2 and Comparative Examples 1 to 3 are shown in Table 1.

TABLE 1

|  | Example 1 | Example 2 | Comparative Example 1 | Comparative Example 2 | Comparative Example 3 |
| --- | --- | --- | --- | --- | --- |
| Type of block copolymer | Tri-block | Tri-block | Di-block | Di-block | Di-block |

1. Preparation of Pressure-Sensitive Adhesive Composition and Polarizing Plate to Evaluate Durability Preparation of Pressure-Sensitive Adhesive Composition Toluene diisocyanate (Soken Inc.) as a crosslinking agent, a cyanoacetoxypropyl trimethoxy silane (LG Chemical Ltd.) as a silane coupling agent, and dibutyltindilaurate (Aldrich Inc.) as a curing accelerator were mixed with a resin with which the block copolymers were prepared in Examples 1 and 2 and Comparative Examples 1 to 3 in a ratio shown in Table 2, and coating solids were controlled to 30 wt %, thereby, preparing pressure-sensitive adhesive compositions.

TABLE 2

|  |  | Example 1 | Example 2 | Comparative Example 1 | Comparative Example 2 | Comparative Example 3 |
| --- | --- | --- | --- | --- | --- | --- |
| Block copolymer | Type | Tri-block | Tri-block | Di-block | Di-block | Di-block |
|  | Content | 100 | 100 | 100 | 100 | 100 |
| Content of crosslinking agent |  | 0.3 | 0.2 | 0.2 | 0.2 | 0.2 |
| Content of curing accelerator |  | 0.012 | 0.012 | 0.012 | 0.012 | 0.012 |
| Content of silane coupling agent |  | 0.065 | 0.065 | 0.065 | 0.065 | 0.065 |
| Coating solid (wt %) |  | 30 | 30 | 23 | 23 | 23 |
| Thickness of pressure-sensitive adhesive layer |  | 23 | 23 | 23 | 23 | 23 |

Content unit: parts by weight (based on content of block copolymer)

Crosslinking agent: toluene diisocyanate

Silane coupling agent: cyanoacetoxypropyl trimethoxy silane

Curing accelerator: Tin-based curing accelerator, dibutyltindilaulate

Preparation of Polarizing Plate

The pressure-sensitive adhesive compositions prepared in Examples 1 and 2 and Comparative Examples 1 to 3 were dried to have a thickness of 23 μm, coated on a releasing-treated poly(ethyleneterephthalate) (PET) film (Mitsubishi Corp.) having a thickness of 38 μm, and dried again at approximately 110° C. for approximately 3 minutes. Afterward, a polarizing plate was prepared by attaching a wide view (WV) coating layer of a polarizing plate on one surface of which was coated with a WV liquid crystal layer.

2. Calculation of Glass Transition Temperature

A glass transition temperature (Tg) of each block of a block copolymer was calculated by the following Equation.

$$1/Tg = \Sigma Wn/Tn \quad \text{<Equation>}$$

In this equation, Wn is a weight fraction of a monomer used in each block, and Tn is a glass transition temperature shown when the monomer used herein formed a homopolymer.

That is, in the equation, the right side is a result obtained by calculating a value (Wn/Tn) obtained by dividing a weight fraction of the monomer used herein by a glass transition temperature exhibited when all of the monomer forms a homopolymer, and summarizing all of the values.

3. Measurement of Number Average Molecular Weight (Mn)

A number average molecular weight (Mn) was measured under the following conditions using GPC, and to draw a calibration curve, standard polystyrene of an Agilent system was used, and measurement results were converted.
<Measurement Conditions>
Measuring Tool: Agilent GPC (Agilent 1200 series, U.S.)
Column: two connected PL mixed B
Column Temperature: 40° C.
Eluent: Tetrahydrofuran (THF)
Flow Rate: 1.0 mL/min
Concentration: ~1 mg/mL (100 μL injection)

4. Evaluation of Durability

A specimen was manufactured by cutting the prepared polarizing plate to a size of 180 cm×320 cm (length×width), and attached to a commercially-available 19-inch panel. Afterward, the panel was stored at approximately 50° C. under approximately 5 atm for approximately 20 minutes to prepare a sample polarizing plate.

Humidity and Heat Resistance and Durability

To evaluate humidity, heat resistance, and durability with respect to the prepared sample polarizing plate, the prepared sample polarizing plate was left for approximately 300 hours under conditions of a temperature of approximately 60° C. and a relative humidity of approximately 90%, and bubbling or peeling occurring at a pressure-sensitive adhesive interface was observed with the naked eye.

Heat Resistance and Durability

To evaluate heat resistance and durability with respect to the prepared sample polarizing plate, the prepared sample polarizing plate was left at approximately 90° C. for approximately 300 hours, and bubbling or peeling occurring at a pressure-sensitive adhesive interface was observed with the naked eye.

Room Temperature/Low Humidity Durability

To evaluate room temperature/low humidity durability with respect to the prepared sample polarizing plate, the prepared sample polarizing plate was left for approximately 30 days under conditions of a temperature of approximately 25° C. and a relative humidity of approximately 25%, and bubbling or peeling occurring at a pressure-sensitive adhesive interface was observed with the naked eye.

Evaluation criteria for the durability are as follows.
<Criteria for Evaluating Durability>
◯: when bubbling and peeling did not occur
Δ: when some bubbling and/or peeling were observed
X: when large amount of bubbles and/or peeling was observed The number average molecular weight (Mn) and durability measured and evaluated in Examples 1 and 2 and Comparative Examples 1 to 3 are summarized and listed in Table 3.

TABLE 3

|  |  | Example 1 | Example 2 | Comparative Example 1 | Comparative Example 2 | Comparative Example 3 |
|---|---|---|---|---|---|---|
| Type of block copolymer | | Tri-block | Tri-block | Di-block | Di-block | Di-block |
| Glass transition temperature | First block | −47° C. | −47° C. | −47° C. | −47° C. | −47° C. |
| | Second block | 107° C. | 107° C. | 107° C. | 107° C. | 107° C. |
| | Third block | −47° C. | −47° C. | — | — | — |
| number average molecular weight (Mn) | | 220,000 | 220,000 | 70,000 | 100,000 | 150,000 |
| Heat resistance and durability | | ◯ | ◯ | ◯ | ◯ | ◯ |
| Humidity resistance and durability | | ◯ | ◯ | Δ | ◯ | ◯ |
| Room temperature/low humidity durability | | ◯ | ◯ | X | X | X |

As shown in Table 3, the multi-block copolymer prepared using a compound containing at least two halogen atoms may have a higher molecular weight than when the block copolymer is prepared using a compound containing one halogen atom, and it was confirmed that when the multi-block copolymer was applied to the pressure-sensitive adhesive composition, it had very excellent durability at room temperature and low humidity.

A pressure-sensitive adhesive composition including a multi-block copolymer according to the present invention can have excellent durability regardless of temperature and/or humidity. In addition, a method of preparing a multi-block copolymer can prepare a multi-block copolymer having a higher molecular weight which is structurally controlled by a simple process using a compound containing at least two halogen atoms, and when the multi-block copolymer is included in a pressure-sensitive adhesive resin, it can have an excellent cohesive strength in the resin, and form a network structure during curing. Accordingly, when applied to a pressure-sensitive adhesive composition, the multi-block copolymer may be usefully applied to an optical member due to excellent durability regardless of a temperature and humidity.

While the invention has been shown and described with reference to certain exemplary embodiments thereof, it will be understood by those skilled in the art that various changes in form and details may be made therein without departing from the scope of the invention as defined by the appended claims.

What is claimed is:

1. A multi-block copolymer, comprising:
   a first block having a glass transition temperature of −10° C. or less;
   a second block having a glass transition temperature of 50° C. or more; and
   a third block having a glass transition temperature of −10° C. or less,
   wherein the multi-block copolymer is a tri-block copolymer in which the first and third blocks are coupled at both ends of the second block,
   wherein a crosslinkable functional group is present in the first or third block, and
   wherein the first or third block comprises a polymerized unit of 90 to 99.9 parts by weight of an acrylic acid ester monomer and 0.1 to 10 parts by weight of a copolymerizable monomer having the crosslinkable functional group.

2. The multi-block copolymer of claim 1, wherein the crosslinkable functional groups are comprised in the first and third blocks.

3. The multi-block copolymer of claim 1, wherein the crosslinkable functional group comprised in the first or third block is at least one selected from the group consisting of a hydroxyl group, a carboxyl group, an isocyanate group and a glycidyl group.

4. The multi-block copolymer of claim 1, which has a number average molecular weight (Mn) of 160,000 or more.

5. A pressure-sensitive adhesive composition, comprising: the multi-block copolymer of claim 1.

6. The pressure-sensitive adhesive composition of claim 5, further comprising:
   a crosslinking agent having at least two functional groups capable of reacting with a crosslinkable functional group.

7. A method of preparing the multi-block copolymer of claim 1, comprising:
   polymerizing a polymerizable monomer in the presence of a catalyst, a ligand capable of coordinate-binding with the catalyst, and an initiator having at least two bonds of Formula 3 in a structure:

$$C—X \quad \text{[Formula 3]}$$

where C is a carbon atom, X is selected from the group consisting of a halogen atom, CN, $SR_1$, $N_3$, $S—C(=S)R_2$, and $S—C(=S)N(R_3)_2$, in which $R_1$ to $R_3$ are each independently CN, an aryl having 6 to 20 carbon atoms, an alkyl having 1 to 20 carbon atoms, or an alkylthio having 1 to 20 carbon atoms, and in the case of an $N(R_3)_2$ group, a 5- or 6-membered heterocyclic ring is formed by coupling two $R_3$ groups, In addition, the $R_1$ to $R_3$ may be substituted with at least one halogen.

8. The method of claim 7, wherein the catalyst is a compound represented by Formula 5:

$$M^{n+}X_n \quad \text{[Formula 5]}$$

where $M^{n+}$ is selected from the group consisting of $Cu^{+1}$, $Cu^{+2}$, $Fe^{+2}$, $Fe^{+3}$, $Ru^{+2}$, $Ru^{+3}$, $Cr^{+2}$, $Cr^{+3}$, $Mo^{+2}$, $Mo^{+3}$, $W^{+2}$, $W^{+3}$, $Mn^{+3}$, $Mn^{+4}$, $Rh^{+3}$, $Rh^{+4}$, $Re^{+2}$, $Re^{+3}$, $Co^+$, $Co^{+2}$, $V^{+2}$, $V^{+3}$, $Zn^+$, $Zn^{+2}$, $Au^+$, $Au^{+2}$, $Ag^+$ and $Ag^{+2}$, X is a halogen atom, and n is an integer of 1 to 4 as a formal charge of a metal.

9. The method of claim 8, wherein the catalyst is $Cu(II)Cl_2$, $Cu(II)Br_2$, $Cu(II)I_2$ or a mixture thereof.

10. The method of claim 7, wherein the catalyst is comprised at 0.001 to 1 part by weight, relative to 100 parts by weight of the polymerizable monomer.

11. The method of claim 7, wherein the ligand is a ligand having at least one nitrogen, oxygen, phosphorous, or sulfur atom that is coordinated with a catalyst through a σ-bond; or a ligand containing at least two carbon atoms that is coordinated with a catalyst through a π-bond.

12. The method of claim 7, wherein the initiator having at least two bonds of Formula 3 in the structure is a compound having at least two units represented by Formula 6:

$$—O—C(O)—(R_{13}R_{14})C—X \quad \text{[Formula 6]}$$

where $R_{13}$ and $R_{14}$ are hydrogen or an alkyl having 1 to 4 carbon atoms, and X is a halogen atom.

13. The method of claim 7, wherein the initiator having at least two bonds of Formula 3 in the structure is a compound represented by Formula 7:

$$X—C(R_{13}R_{14})—C(O)—O—Y—O—(O)C—(R_{15}R_{16})C—Z \quad \text{[Formula 7]}$$

where $R_{13}$ to $R_{16}$ are each independently hydrogen or an alkyl having 1 to 8 carbon atoms, X and Z are each independently a halogen atom, and Y is an alkylene having 1 to 8 carbon atoms.

14. The method of claim 12, wherein the initiator is ethylene bis(2-bromoisobutyrate), 1,1,1-tris(2-bromoisobutyryloxymethyl)ethane, pentaerythritol tetrakis(2-bromoisobutyrate), dipentaerythritol hexakis(2-bromoisobutyrate), or a mixture thereof.

15. The method of claim 7, wherein the initiator is comprised at 0.01 to 5 parts by weight, relative to 100 parts by weight of the polymerizable monomer.

16. The method of claim 7, wherein the polymerizing of the polymerizable monomer comprises:
   preparing a macroinitiator by polymerizing a polymerizable monomer in the presence of an initiator, a catalyst, a ligand, and a reducing agent; and
   preparing a multi-block copolymer by polymerizing a polymerizable monomer in the presence of the macroinitiator, the catalyst, the ligand, and the reducing agent.

17. The method of claim 16, wherein the reducing agent is an organic reducing agent or an inorganic reducing agent.

18. A pressure-sensitive adhesive polarizing plate, comprising:
   a polarizer; and
   a pressure-sensitive adhesive layer present on one or both surfaces of the polarizer, and formed from the pressure-sensitive adhesive composition of claim 5.

19. A liquid crystal display device, comprising:
   the pressure-sensitive adhesive polarizing plate of claim 18 attached to one or both surfaces of a liquid crystal panel.

20. The method of claim 13, wherein the initiator is ethylene bis(2-bromoisobutyrate), 1,1,1-tris(2-bromoisobutyryloxymethyl)ethane, pentaerythritol tetrakis(2-bromoisobutyrate), dipentaerythritol hexakis(2-bromoisobutyrate), or a mixture thereof.

* * * * *